(12) United States Patent
MacDonald et al.

(10) Patent No.: US 11,481,863 B2
(45) Date of Patent: Oct. 25, 2022

(54) METHODS AND APPARATUS FOR HARDWARE ACCELERATED IMAGE PROCESSING FOR SPHERICAL PROJECTIONS

(71) Applicant: GoPro, Inc., San Mateo, CA (US)

(72) Inventors: William Edward MacDonald, Oceanside, CA (US); Kyler William Schwartz, Valley Center, CA (US); David A. Newman, San Diego, CA (US)

(*) Notice: Subject to any disclaimer, the term of this patent is extended or adjusted under 35 U.S.C. 154(b) by 40 days.

(21) Appl. No.: 17/079,183

(22) Filed: Oct. 23, 2020

(65) Prior Publication Data

US 2021/0125303 A1 Apr. 29, 2021

Related U.S. Application Data

(60) Provisional application No. 62/925,138, filed on Oct. 23, 2019.

(51) Int. Cl.
| | |
|---|---|
| *G06T 1/20* | (2006.01) |
| *G06T 1/60* | (2006.01) |
| *G06T 5/50* | (2006.01) |
| *G06T 5/00* | (2006.01) |

(52) U.S. Cl.
CPC ............ *G06T 1/20* (2013.01); *G06T 1/60* (2013.01); *G06T 5/002* (2013.01); *G06T 5/50* (2013.01); *G06T 2207/20221* (2013.01)

(58) Field of Classification Search
CPC .. G06T 1/20; G06T 1/60; G06T 5/002; G06T 5/50; G06T 2207/20221; H04N 5/23238
See application file for complete search history.

(56) References Cited

U.S. PATENT DOCUMENTS

| | | | |
|---|---|---|---|
| 9,294,757 B1* | 3/2016 | Lewis | G06F 3/038 |
| 10,321,109 B1* | 6/2019 | Tanumihardja | G09G 5/363 |
| 2018/0288356 A1* | 10/2018 | Ray | H04N 13/139 |
| 2018/0343470 A1* | 11/2018 | Schmit | H04N 19/593 |

FOREIGN PATENT DOCUMENTS

WO  WO-2018236050 A1 * 12/2018 ........... H04N 19/166

* cited by examiner

*Primary Examiner* — Jennifer Mehmood
*Assistant Examiner* — Donna J. Ricks
(74) *Attorney, Agent, or Firm* — Wang Hardoon, P.C.; Mark Wang; David Hardoon

(57) ABSTRACT

Methods and apparatus for image processing of spherical content via hardware acceleration components. In one embodiment, an EAC image is subdivided into facets via existing software addressing and written into the memory buffers (normally used for rectilinear cubemaps) in a graphics processing unit (GPU). The EAC facets may be translated, rotated, and/or mirrored so as to align with the expected three-dimensional (3D) coordinate space. The GPU may use existing hardware accelerator logic, parallelization, and/or addressing logic to greatly improve 3D image processing effects (such as a multi-band blend using Gaussian blurs.)

19 Claims, 11 Drawing Sheets

EAC DATA STRUCTURE

RECTILINEAR CUBEMAP DATA STRUCTURE

LINEAR
BLUR

3X3
GAUSSIAN
BLUR

METHODS AND APPARATUS FOR HARDWARE ACCELERATED IMAGE PROCESSING FOR SPHERICAL PROJECTIONS

PRIORITY

This application claims the benefit of priority to co-owned U.S. Patent Application Ser. No. 62/925,138 filed Oct. 23, 2019 and entitled "METHODS AND APPARATUS FOR HARDWARE ACCELERATED IMAGE PROCESSING FOR SPHERICAL PROJECTIONS", which is incorporated by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

Field of the Disclosure

This disclosure relates to image processing. Specifically, the present disclosure relates in one exemplary aspect to image processing of spherical content within embedded systems (e.g., processor, memory, and/or battery constrained consumer electronics devices).

Description of Related Art

Sophisticated image processing techniques can be used to achieve a number of different visual effects. As but one such example, "multi-band blending" is a commonly used technique for combining images. Advantageously, multi-band blending preserves high frequency image information (e.g., edges are not washed out), while still ensuring that low frequency image information is smoothly blended.

Unfortunately, due to the high memory and computational complexity requirements, sophisticated image processing has historically been relegated to resource intensive environments; e.g., post-processing workstations and/or specialized video game hardware acceleration. Existing solutions are not desirable for embedded device manufacturers (such as the GoPro HERO™ or Fusion™ families of devices manufactured by the Assignee hereof) or their ecosystems (e.g., smart phones, laptops, and/or other mobile media playback devices).

SUMMARY

The present disclosure satisfies the foregoing needs by providing, inter alia, methods and apparatus for enabling image processing of spherical content within embedded systems.

In one aspect, methods and apparatus configured to enable image processing of spherical content within embedded systems are disclosed. In one exemplary embodiment, the method includes: obtaining spherical content; writing spherical content to one or more memory structures; enabling hardware accelerated image processing from the one or more memory structures; reading processed spherical content from the one or more memory structures; and consuming the processed spherical content.

In one variant of the foregoing method, the obtaining of the spherical content includes: obtaining a plurality of content portions from respective plurality of image-capture apparatus; combining the plurality of content portions via at least a stitch operation; and generating an equi-angular cubemap (EAC) projection based on the combining of the plurality of content portions, the spherical content including the EAC projection.

In another variant, the enabling the hardware accelerated image processing includes enabling a blurring function on at least a portion of the spherical content via a graphics processing unit (GPU).

In another variant, the enabling of the blurring function includes enabling a Gaussian blur, the Gaussian blur configured to implement a plurality of blurs on the spherical content, the plurality of blurs includes a respective weight corresponding to a respective spatial location associated with the spherical content.

In a further variant, the writing the spherical content to one or more memory structures includes: writing the spherical content to one or more memory buffers of the GPU; and causing at least one image transformation of at least a portion of the spherical content.

In still another variant, the method further includes performing the blurring function on the at least portion of the spherical content via only the GPU without usage of emulation of the GPU.

In yet another variant, the method further includes generating an equi-angular cubemap (EAC) projection; storing each one of a plurality of cube faces associated with the EAC projection into a respective one of a plurality of memory structures of a computerized apparatus; and enabling transfer of the adjusted plurality of cube faces to another computerized apparatus.

In a related aspect, an apparatus configured to perform the foregoing techniques are described. In one exemplary embodiment, the apparatus may include a processor, and a non-transitory computer-readable medium including one or more instructions which when executed, cause the apparatus to: obtain spherical content; write spherical content to one or more memory structures; enable hardware accelerated image processing from the one or more memory structures; read processed spherical content from the one or more memory structures; and consume the processed spherical content.

In another embodiment of the foregoing apparatus, the apparatus includes a plurality of image-capture apparatus; dedicated hardware apparatus; a processor apparatus; one or more memory apparatus configured for data communication with the processor apparatus and the plurality of image-capture apparatus; and logic configured to, when operated by the processor apparatus: receive image data from each of the plurality of image-capture apparatus; acquire spherical content based on the image data; obtain an image projection based on the spherical content; store one or more portions of the image projection to the one or more memory apparatus; and implement the hardware apparatus to modify the one or more portions of the image projection.

In one variant of the foregoing apparatus, the logic is further configured to acquire the one or more portions of the image projection via implementation of software emulation of the hardware apparatus.

In another variant, the image projection includes an equi-angular cubemap (EAC) projection; the one or more portions include a plurality of cube facets of the EAC projection; and the plurality of cube facets are acquired via the implementation of software emulation of the hardware apparatus.

In another variant, the hardware apparatus includes at least one graphics processing unit (GPU), the GPU configured to perform Gaussian blurring on the one or more portions of the image projection.

In a further variant, the acquisition of the spherical content includes a stitch of the image data.

In another variant, the plurality of image-capture apparatus include a pair of cameras facing away from each other, the pair of cameras each configured to capture hyper-hemispherical images, the pair of cameras positioned such that the hyper-hemispherical images each include one or more overlapping regions with respect to each other.

In another related aspect, methods, systems, and apparatus for image processing of spherical content within embedded systems are disclosed.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device includes a multi-logic block FPGA device.

In another aspect, a non-transitory computer-readable apparatus implementing one or more of the foregoing aspects is disclosed and described. In one embodiment, the computer readable apparatus includes a program memory, or an EEPROM. In another embodiment, the apparatus includes a solid-state drive (SSD) or other mass storage device. In another embodiment, the apparatus includes a USB or other "flash drive" or other such portable removable storage device.

In another embodiment of the non-transitory computer-readable apparatus, the non-transitory computer readable apparatus includes a storage medium, the storage medium including a plurality of instructions configured to, when executed by a processor apparatus, cause a computerized apparatus to at least: access content including an equi-angular cubemap (EAC); obtain a plurality of facets from the EAC via software emulation of hardware; and perform hardware-based image processing on the plurality of facets of the EAC to obtained processed image content.

In one variant of the foregoing non-transitory computer-readable apparatus, the plurality of instructions are further configured to, when executed by a processor apparatus, cause the computerized apparatus to at least perform one or more of: (i) reconstruction of the processed image content from the processed plurality of facets, or (ii) transfer of the processed image content to another computerized apparatus.

In yet another variant, the plurality of instructions are further configured to, when executed by a processor apparatus, cause the computerized apparatus to at least determine one or more wrapping relationships between at least two facets of the plurality of facets, each of the one or more wrapping relationships configured to identify one or more adjacent pixels of the at least two facets as neighbors.

In another variant, the plurality of instructions are further configured to, when executed by a processor apparatus, cause the computerized apparatus to at least perform one or more of upsampling or downsampling of the processed image content.

In yet a further variant, the plurality of instructions are further configured to, when executed by a processor apparatus, cause the computerized apparatus to at least: perform one or more of image adjustments; and based on the one or more image adjustments, align the one or more facets with three-dimensional coordinate space.

In another variant, the accessed content includes stitched content derived from a plurality of image data captured by respective ones of a plurality of image-capture devices.

In another variant, the hardware-based image processing performed on the plurality of facets of the EAC includes usage of hardware apparatus, the hardware apparatus including at least one graphics processing unit (GPU).

Other aspects, features and advantages of the present disclosure will immediately be recognized by persons of ordinary skill in the art with reference to the attached drawings and detailed description of exemplary embodiments as given below.

BRIEF DESCRIPTION OF THE DRAWINGS

The disclosed embodiments have other advantages and features which will be more readily apparent from the following detailed description of the invention and the appended claims, when taken in conjunction with the accompanying drawings.

All Figures disclosed herein are © Copyright 2019-2020 GoPro, Inc. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to any single implementation or implementations, but other implementations are possible by way of interchange of, substitution of, or combination with some or all of the described or illustrated elements. Wherever convenient, the same reference numbers will be used throughout the drawings to refer to same or like parts.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Existing Multi-Band Image Blending

As a brief aside, there are many different image processing techniques that may be used to blend images; one commonly used technique is so-called "multi-band blending."

Figure 1A:
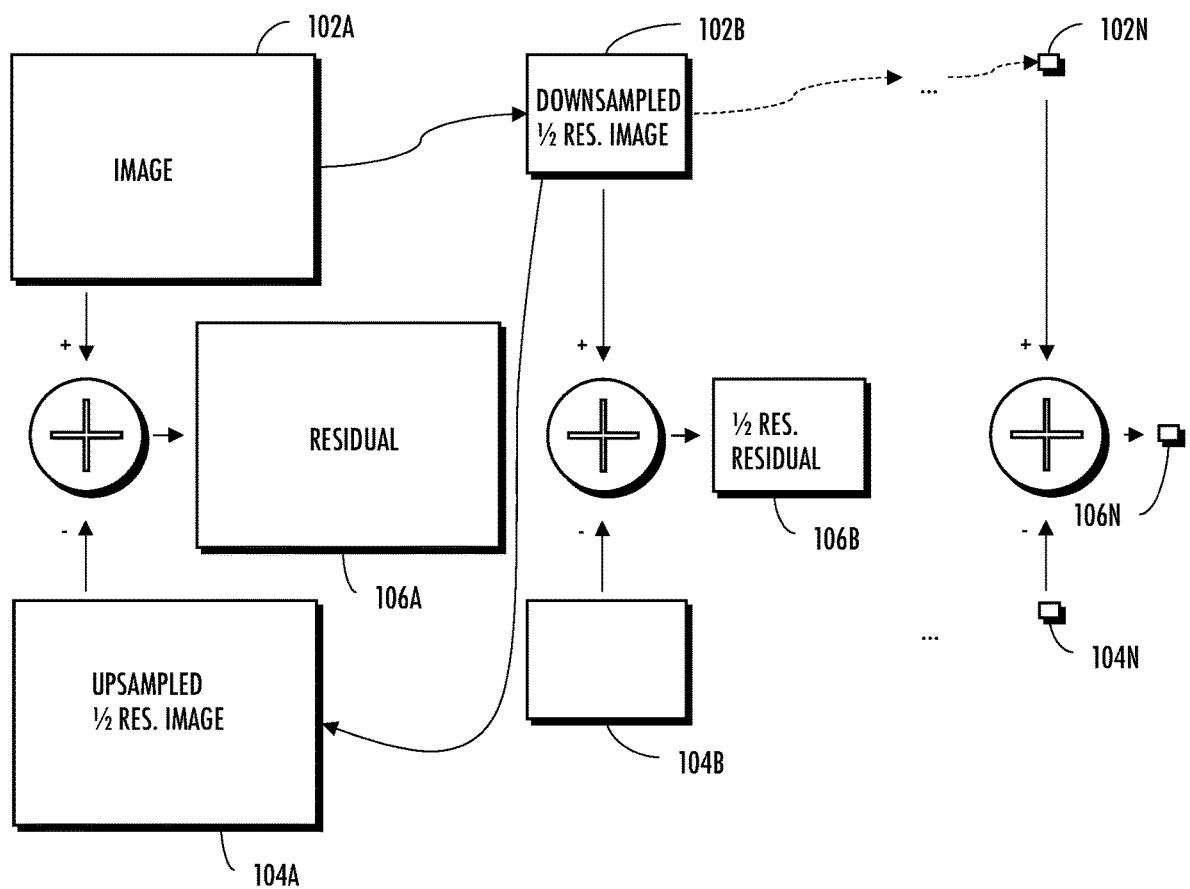
FIG. 1A is a graphical representation of "pyramid" image processing, useful in explaining multi-band blending.

FIG. 1A is a graphical representation of "pyramid" image processing useful in explaining multi-band blending. As shown in FIG. 1A, an image can be separated into its constituent frequency components via an iterative process of blurring and subtraction. This is analogous to a two-dimensional wavelet transform (a decomposition of a signal into a set of contractions, expansions, and translations of a basis wavelet) For example, an image 102A may be downsampled to a half-resolution image 102B. The half-resolution image 102B is then upsampled to create an upsampled ½ resolution image 104A. The residual image 106A is created by subtracting the upsampled image 104A from the original image 102A. This process is iteratively repeated to the extent required (each iteration requires more processing resources but preserves fidelity across a broader frequency range). Notably, the residual "pyramid" of images 106A through 106N contains all of the difference information necessary to recreate the original image 102A from the downsampled counterpart 102N (which may be a single pixel for images having evenly divisible dimensions).

Figure 1B:
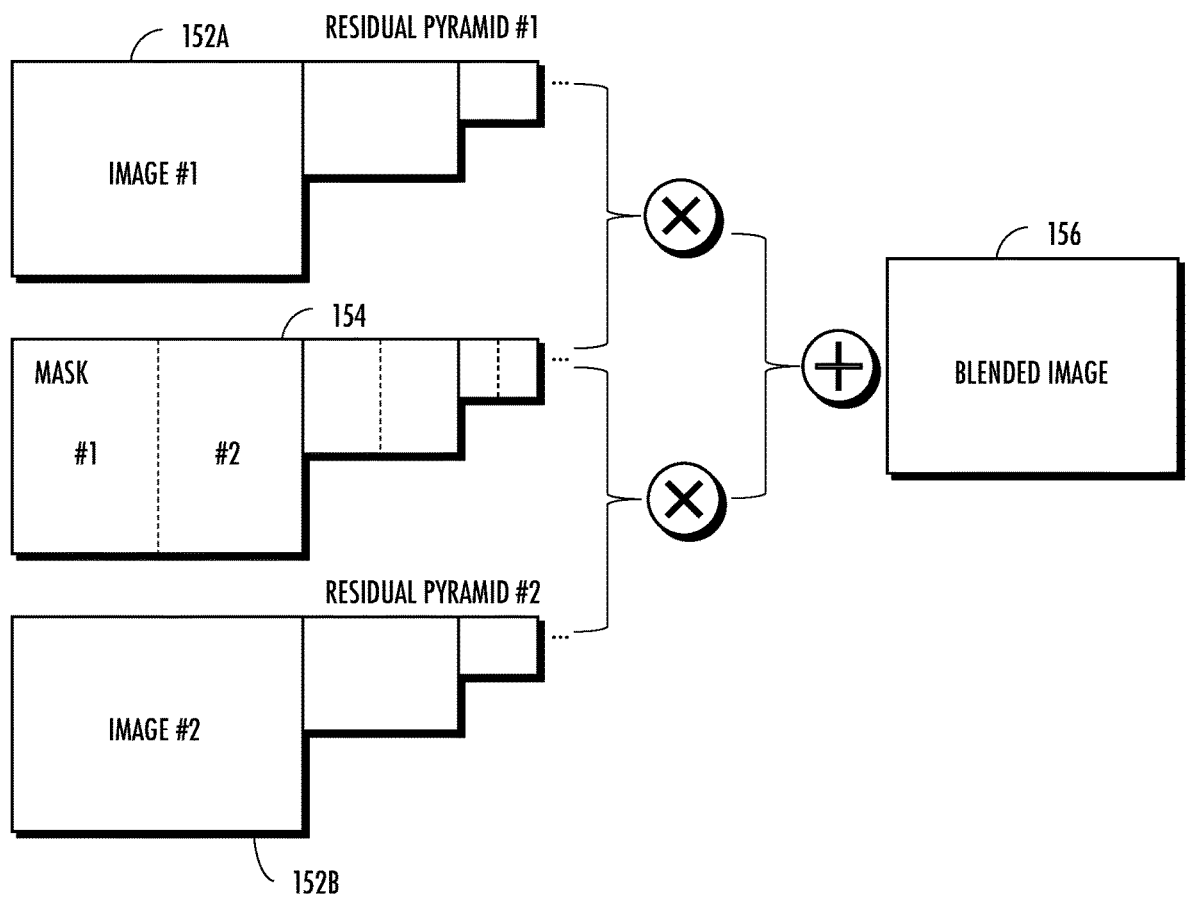
FIG. 1B is a graphical representation of multi-band blending based on pyramid image representations, useful in explaining various embodiments of the present disclosure.

Referring now to FIG. 1B, one representation of multi-band blending based on pyramid image representations is shown. As shown therein, multi-band blending can be performed with two images by building residual pyramid image representations 152A, 152B of the two images. A "mask" pyramid 154 is constructed. The mask 154 defines a blend weight between the first and the second image pyramids for each pyramid level. For each pyramid level, the levels of the two pyramids 152A, 152B are combined based on the weights of the mask pyramid 154 and summed together. Collapsing together all the level-wise summations, generates a resulting output blended image 156.

Many variants of multi-band blending exist for a variety of different applications and/or constraints. For example, some implementations may only use a subset of the image pyramid tiers, so as to reduce processing and/or memory burden (resulting in some image information loss). Similarly, some implementations may use different masking weights; for example, linear weights and gaussian weights. Yet other variants may adjust how upsampling and/or downsampling are performed; for example, "non-power-of-two" images cannot be evenly halved (downsampled); a variety of techniques exist to handle the remainders.

Equi-Angular (EAC) Cubemap Versus Rectilinear Cubemap Projections

Recently, the growing popularity of action cameras and other wide-angle field of view (FOV) applications have elevated the importance of three-dimensional (3D) image data structures. Two of the most popular projections are equi-angular cubemap (EAC) and rectilinear cubemap.

Figure 2A:
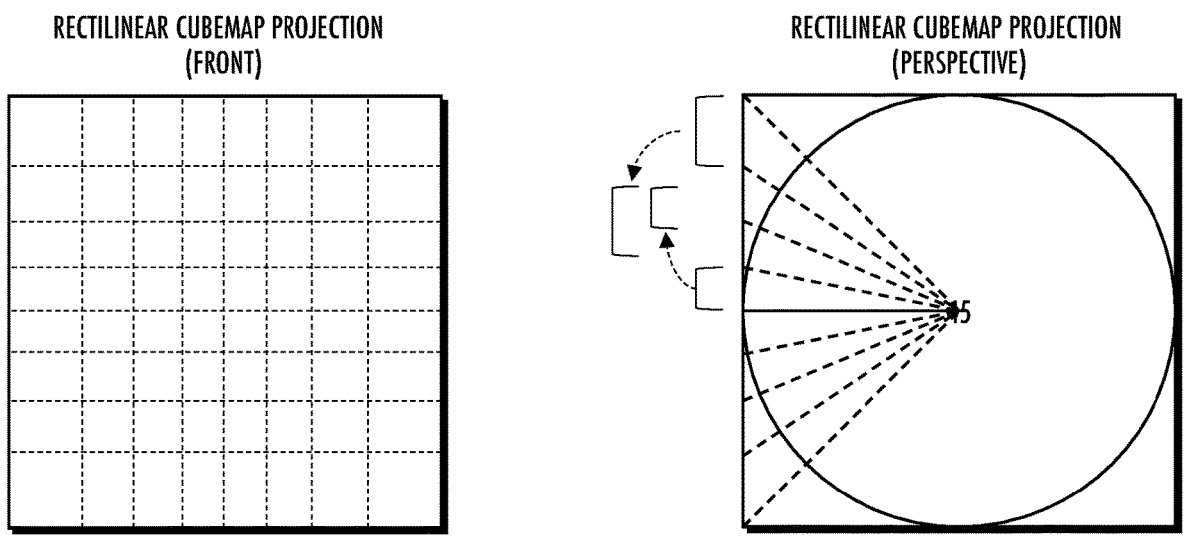
FIGS. 2A-2C are graphical representations of rectilinear cubemaps and equi-angular cubemaps (EAC), useful in explaining various embodiments of the present disclosure.

FIG. 2A is a graphical representation of frontal and perspective projection according to a rectilinear cubemap. A rectilinear cubemap projects an image onto a flat surface using a radial projection. As used herein, the term "rectilinear" refers to a visual perspective based on an idealized pin-hole camera at the center of the cube. As shown in the perspective view of FIG. 2A; object size and/or geometry distortion in the image is a function of angular displacement. In other words, rectilinear cubemaps are characterized by a substantial variation in pixel to image information density (pixels/area).

Figure 2B:
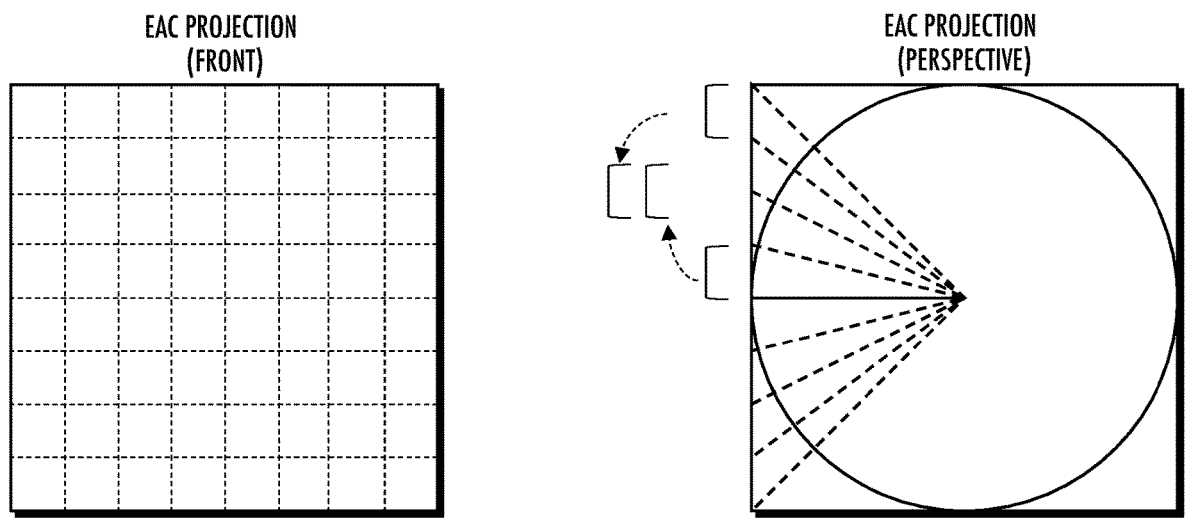

FIG. 2B is a graphical representation of frontal and perspective projection according to an equi-angular cubemap (EAC). Unlike rectilinear cubemaps, the EAC projection projects an image onto a flat surface keeping the amount of pixels constant per unit of angular displacement. EAC does not preserve rectilinearity but does ensure that pixel to image information density (pixels/area) is consistent throughout the entire image.

For further reference, a mathematical conversion between rectilinear cubemap and EAC is provided in a pseudocode snippet, included in APPENDIX A.

Figure 2C:
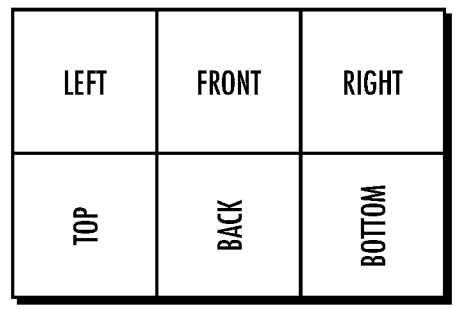
Figure 2C:

FIG. 2C is a graphical illustration of the different data structures used to represent rectilinear cubemaps and equi-angular cubemaps (EAC). As shown therein, the EAC is a two-dimensional (2D) array of pixel values. Notably, the EAC data structure is designed for delivery via commodity codecs and/or legacy image formats (e.g., MPEG A/V containers); existing software addressing techniques for EAC in three-dimensional (3D) coordinate space are typically only used to pack and unpack the image during transfer between devices or playback (seldomly performed). The image data is also rotated so as to minimize compression/decompression artifacts (e.g., left, front, right faces are oriented in the same direction; top, back, bottom faces are oriented in the same direction).

In contrast, rectilinear cubemaps are composed of six (6) distinct two-dimensional (2D) arrays of pixel values (an array of arrays). The rectilinear cubemap data structure originated in video game applications which require intensive image processing. Rectilinear cubemaps can be stored in dedicated hardware specific buffers according to relationships and rotations that have been optimized for graphics processing units (GPUs). For example, even though the cube faces are distinct data structures, GPU hardware-based wrapping logic is designed to treat adjacent pixels (e.g., from top and front faces) as neighbors.

As a brief aside, many video games rely on a "skybox" (a rectilinear cubemap that creates the illusion of distant three-dimensional (3D) surroundings). Notably, rectilinear cubemaps can be quickly displayed, but require significant amounts of memory (e.g., ~191% extra pixels relative to an EAC of the same imagery). More generally, video game consoles are designed to maximize player experience which is why rectilinear cubemaps are preferred; embedded systems operate under a fundamentally different design paradigm which is focused on minimizing memory footprints (as exemplified in the EAC data structure).

Existing Graphics Processing Units (GPUs)

GPUs have a number of characteristics that are functionally different from general purpose processing. As but one example, GPUs are constructed in a highly parallel structure for processing large blocks of image data in parallel (e.g., each pixel of the image may be similarly processed); in contrast, general purpose processing is generalized to handle a much wider variety of processing (e.g., frequent branching and/or conditional operations accessing many different types of data structures). GPUs additionally often incorporate specialized hardware for commonly used operations in image processing; examples of such hardware are e.g., dedicated linear blurring logic. As previously alluded to, GPUs may also include dedicated hardware for addressing rectilinear cubemaps in three-dimensional (3D) coordinate space. Moreover, GPUs provide a plethora of different edge behavior addressing variants that are commonly used in image processing applications (wrapping, clamping, mirroring, etc.)

While GPUs were originally optimized for video game consoles, the "bleed-through" of applications across different consumer electronics devices has resulted in a wide range of devices that include GPUs; commodity GPUs can now be found in embedded camera systems, mobile phones, personal computers, workstations, in addition to video game consoles.

Image Processing Spherical Content for Embedded Systems

Figure 3:
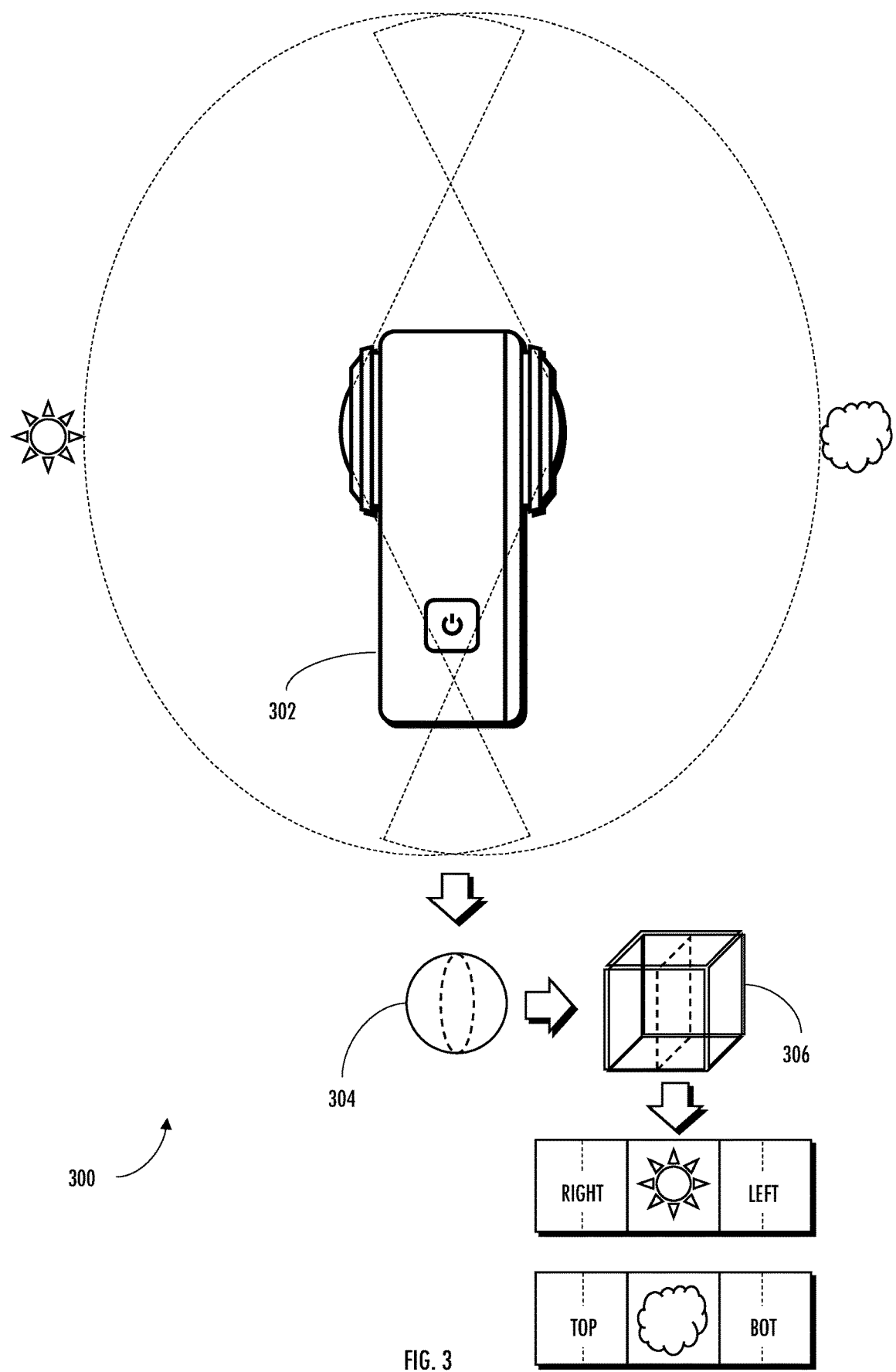
FIG. 3 is a logical block diagram illustrating one exemplary approach for capturing spherical content, useful in explaining various embodiments of the present disclosure.

FIG. 3 illustrates one approach of using two fisheye lenses in a back-to-back configuration to generate a 360° panoramic image, common in so-called "action cameras." In one such implementation, each lens covers more than a hemisphere (e.g., on the order of 190°). As shown therein, a 360° panorama is captured by an action camera 302 in two (2) hyper-hemispherical images with overlapping regions. The action camera 302 stitches together a single spherical projection 304 based on the overlapping regions. The spherical projection 304 may be formatted into an EAC projection 306 for e.g., delivery via commodity codecs and/or image formats such as is described in co-owned and co-pending U.S. patent application Ser. No. 16/572,383 filed Sep. 16, 2019 and entitled "METHODS AND APPARATUS FOR MAXIMIZING CODEC BANDWIDTH IN VIDEO APPLICATIONS," incorporated herein by reference in its entirety.

Notably, action cameras and other 360° applications have unique use considerations that are different than either e.g., traditional photography or video game applications. For example, the action camera 302 has two (2) different lighting conditions: the front camera is well lit, whereas the back camera is poorly lit. The differences in exposure between the front and back camera of FIG. 3 result in unique image processing complications. Specifically, the different lighting conditions for each camera sensor result in different exposure times and shutter speeds which affect color, white balance, and contrast in unpredictable ways. These differences in shooting conditions can create a visible "exposure transition" in the resulting images.

Ideally, the exposure transition can be blended using the aforementioned multi-band blending techniques. Unfortunately, existing image processing alternatives are poorly suited for embedded camera systems and/or other embedded devices (such as mobile phones).

Image processing spherical content in native EAC image formats is undesirable. The EAC data structure (see FIG. 2C supra) is designed to minimize memory footprint for e.g., bulk transport via commodity codecs, and there are no GPUs that natively process EAC formats. Instead, EAC image processing must be handled in software emulation which is slow and power hungry. Software addressing has to repeatedly identify edge continuities in the EAC image array to implement different types of wrapping. And as noted before, general purpose processors are neither parallelized nor specialized for image processing operations.

Similarly, converting an EAC image to a rectilinear cubemap to leverage existing 2D image processing GPU techniques would be impractical. Modifying the post-captured image to a "skybox" would be computationally expensive and memory inefficient (~191% larger). Additionally, video game skyboxes are viewed as drawn; action cameras capture a 3D environment which may require extensive image processing. For example, multi-band blending 3D images requires Gaussian blurs. Further complicating matters, the substantial variation in pixel to image information density (pixels/area) at the edges of rectilinear cubemaps would result in undesirable underweighting of center pixels in Gaussian blurs; this results in noticeable visual artifacts.

Furthermore, embedded camera systems are commonly used on-the-go within an ecosystem of other embedded consumer electronics devices. Even if an embedded camera system could be specifically designed to handle spherical image processing, other embedded devices would not. For example, mobile phones suffer the same limitations; empirically, handling 3D post-processing on mobile phones is undesirably slow, and in some cases, prohibitively so.

To these ends, methods and apparatus are needed to, inter alia, enable sophisticated image processing techniques in embedded device platforms.

Example Operation

Figure 4A:
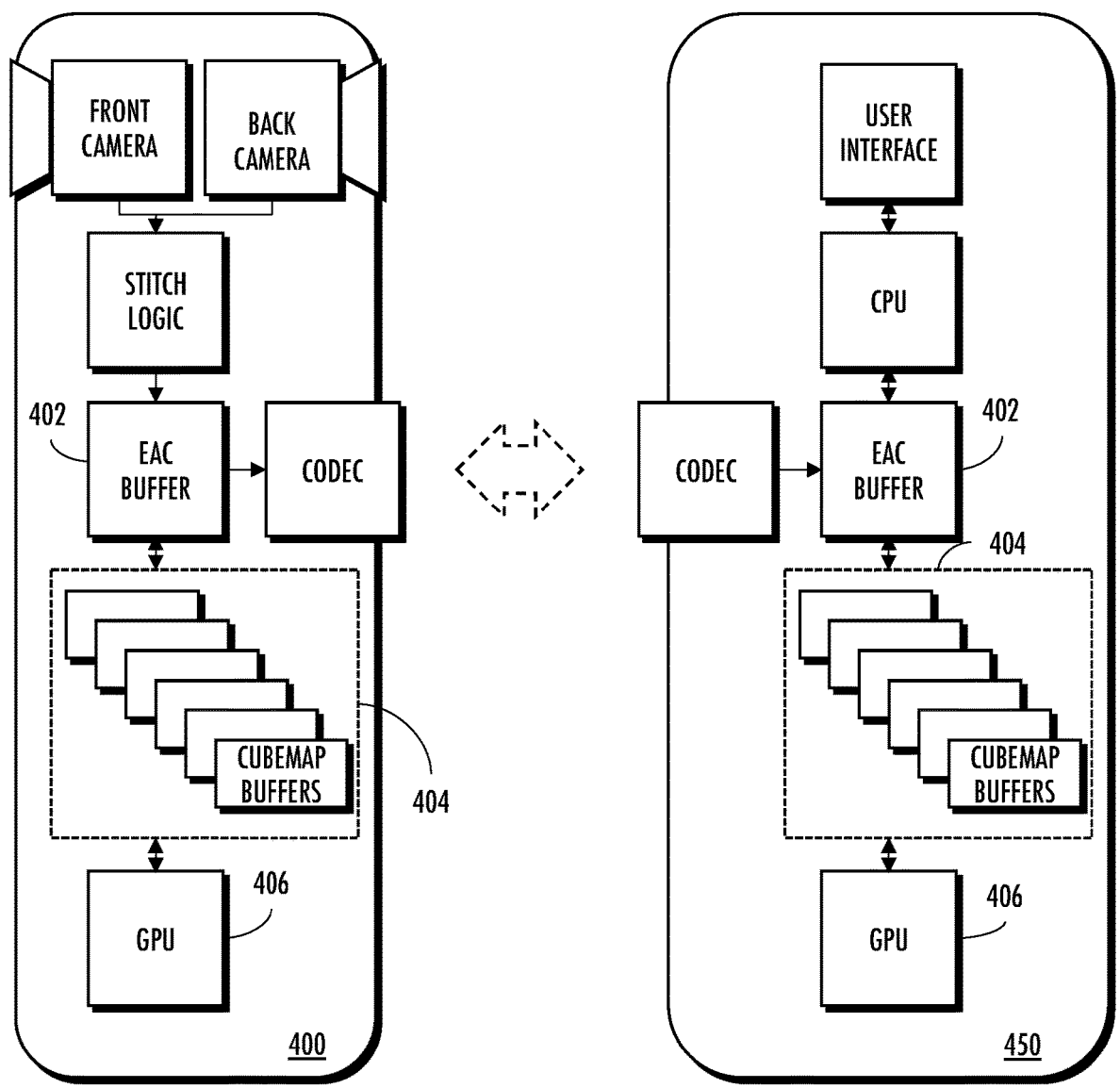
FIG. 4A is a logical block diagram of an action camera in data communication with a smart phone, useful to illustrate various aspects of the present disclosure.

FIG. 4A is a logical block diagram of an action camera 400 in data communication with a smart phone 450, useful to illustrate various aspects of the present disclosure. While the illustrated embodiment is presented in the context of two (2) devices, the various techniques described herein may be performed by either in isolation.

In one exemplary embodiment, the action camera 400 captures two (2) hyper-hemispherical images with overlapping regions. The action camera 400 stitches together a single spherical projection based on the overlapping regions. The spherical projection is stored as an EAC projection into the first memory buffer 402. The EAC projection uses software addressing techniques for EAC in three-dimensional (3D) coordinate space to write each EAC cube face to a second memory buffer 404 that is tightly coupled to a GPU 406. Subsequently thereafter, the GPU 406 is configured to perform three-dimensional (3D) multi-band blending (Gaussian blurring, described hereinafter) to correct for "exposure transitions" (color, white balance, and contrast) caused by different lighting conditions between the front and rear camera. The resulting corrected EAC cube faces are written back to the first memory buffer 402 for transfer off-camera (e.g., to exemplary embedded device 450)

Figure 4B:
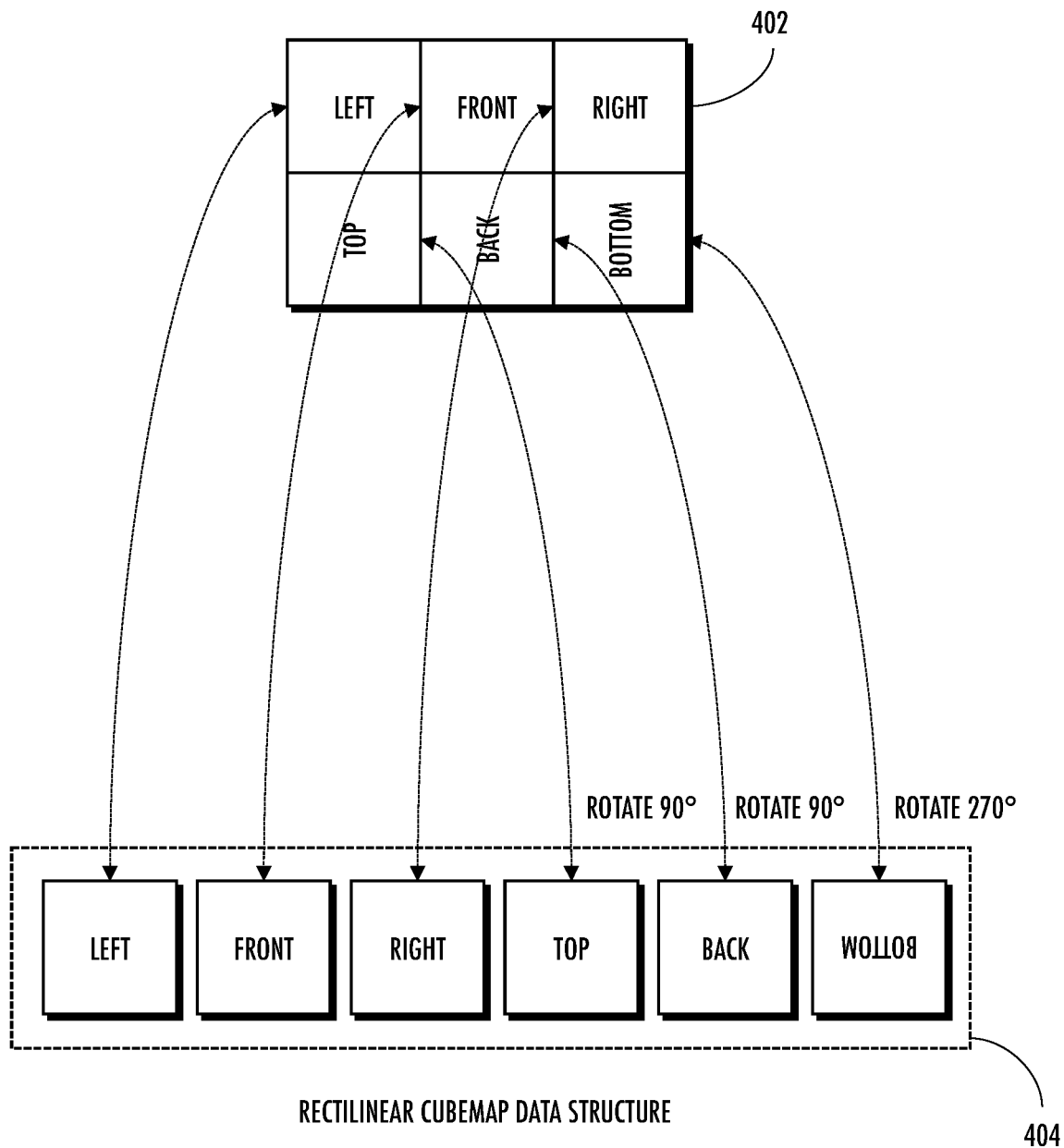
FIG. 4B is a graphical representation of an exemplary memory translation operation between a first memory buffer and a second memory buffer, useful to illustrate various aspects of the present disclosure.

FIG. 4B is a graphical representation of the memory translation operation between the first memory buffer 402 and the second memory buffer 404. As shown therein, the left, front, and right faces can be directly written. For example, the processor can use software based addressing to transfer the left, front, and right EAC faces to the corresponding left, front, and right buffers of the second memory buffer 404. The top, back, and bottom EAC faces are rotated to match the GPU's 406 hardware addressing. In one such implementation, the processor can use software based addressing to read the top and back faces, rotate the top and back faces by 90°, and store the top and back faces to the second memory buffer 404. Similarly, the processor can use software based addressing to read the bottom face, rotate the bottom face by 270°, and store the bottom face to the second memory buffer 404. Notably, the EAC image data is preserved in the translation; the image data stored in the second memory buffer 404 are equi-angular faces, not rectilinear faces.

Referring back to FIG. 4A, in a second exemplary embodiment, an exemplary embedded device 450 receives spherical content via its codec and writes the content into a first memory buffer 402. In some situations, the device 450 may be required to perform an image processing operation (e.g., multi-band blending). Under such circumstances, the device 450 uses software addressing techniques to write the spherical content to the second memory buffer 404. Subsequently thereafter, the GPU 406 can perform the required image processing. The resulting output may be written back to the first memory buffer 402 for consumption thereon.

More directly, various embodiments of the present disclosure perform software translation of the EAC data structure (one (1) 2D array) to the native data structures traditionally used to store rectilinear cubemap faces (six (6) 2D arrays) to leverage existing GPU hardware for 3D image processing. Unlike rectilinear cubemaps, the resulting outputs are translated back to the EAC data structure format for use in the existing EAC ecosystem (e.g., display, transfer, etc.) Advantageously, processing EAC images in this manner leverages existing GPU advantages of e.g., hardware accelerated operations, hardware accelerated addressing, and high parallelization of image data processing.

As a related benefit, the commodity nature of GPU hardware across a variety of embedded devices enables sophisticated 3D image post-processing heretofore not thought possible. In particular, the aggressive processing and/or memory limitations of embedded devices (such as smart phones and personal media devices) could not handle software emulated image processing techniques; as a practical matter, 3D image post-processing has been historically handled within high end desktop processors and/or workstations. The various techniques described herein not only make such image processing possible on embedded devices but do so on commodity components that are already widely deployed and in use.

Gaussian Blurring with Linear Blurs and Hardware Address Acceleration

As previously alluded to, multi-band blending may be used in conjunction with a variety of different blending techniques. Historically, GPUs provide linear blurring for blurring neighboring pixels of a two-dimensional (2D) image. Video game processing uses blurring to emulate a variety of different in-game effects e.g., motion blur, translucency, etc. However, video games seldom require (if at all) any 3D image processing of the skybox, since it was drawn or rendered ahead of time in accordance with the player's intended viewpoint.

Existing 3D image processing techniques for smoothing panoramic multiple camera captures are based on Gaussian blurring. A Gaussian blur (also known as Gaussian smoothing) blurs an image by a Gaussian function to reduce image noise and reduce detail, while still preserving salient edge features. Gaussian blurring closely matches natural vision processing in the human perception system and enables smooth transitions that are visually palatable.

Figure 5A:
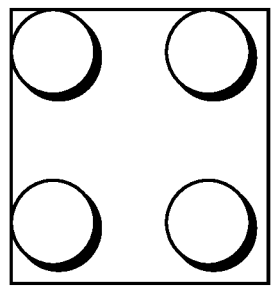
FIG. 5A is a graphical representation of one exemplary method for approximating a Gaussian blur with hardware accelerated linear blur logic, useful to illustrate various aspects of the present disclosure.
Figure 5A:
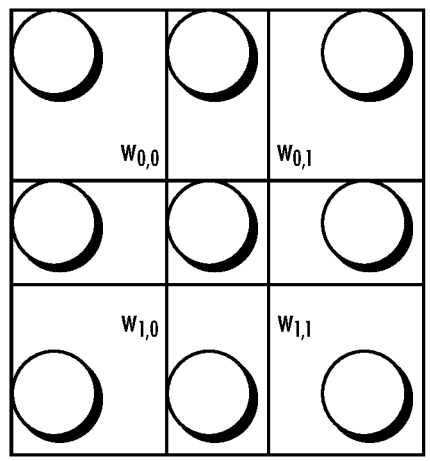

Arithmetically, Gaussian blurring can be approximated as a plurality of linear blurs of different weight. For example, as shown in FIG. 5A, a 3×3 Gaussian blur can be implemented as four (4) linear blurs, each having a weight ($w_{0,0}$, $w_{0,1}$, $w_{1,0}$, $w_{1,1}$) corresponding to spatial location within the blur. Notably, Gaussian blurs may be of N×N dimension, the 3×3 implementation is purely an illustrative example. Handling Gaussian blurring with GPU linear blurring hardware acceleration (rather than in software emulation) provides substantial benefits both in power and memory as well as massive parallelization over the entire 2D EAC face.

Figure 5B:
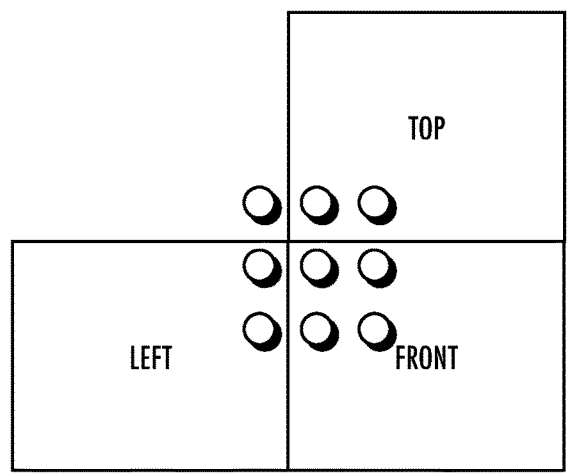
FIG. 5B is a graphical representation of hardware accelerated addressing logic, useful to illustrate various aspects of the present disclosure.
Figure 5B:
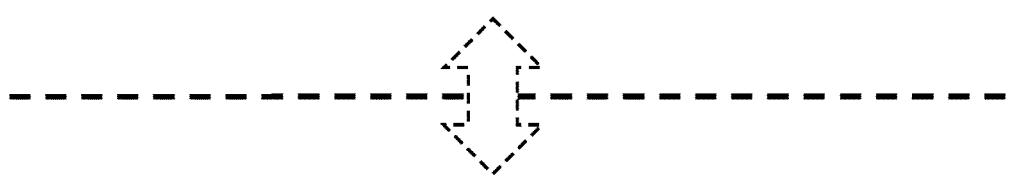
Figure 5B:
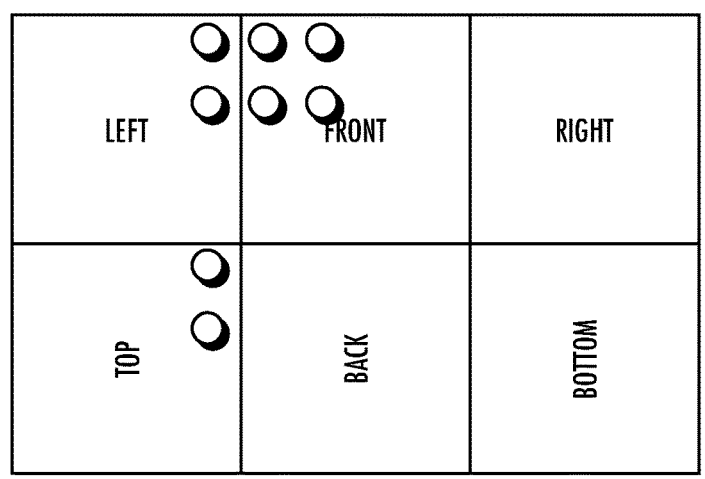

As previously alluded to, in traditional EAC formats, every pixel of the EAC data structure has to be checked for wrapping behavior in order to properly perform a Gaussian blur. For example, as shown in FIG. 5B, the 3×3 Gaussian blur is shown (not to scale) spanning the edges of the top-left-front EAC corner; two pixels (top face) are located in a wholly unrelated location and orientation of the EAC data structure. For a 3×3 Gaussian blur, nine (9) checks are required; for an N×N Gaussian blur, $N^2$ software address checks are required. The processing overhead for correct wrapping behavior is extraordinarily burdensome on embedded devices.

In contrast, various embodiments of the present disclosure greatly improve performance because the GPU handles hardware addressing natively across the EAC cube faces (no software addressing is required at all). There is no translation delay for blurs that span edges; the GPU hardware correctly treats adjacent pixels from different faces as neighbors. Similarly, existing GPU hardware accelerators handle non-power-of-two remainders for off-size displays (such as are common in wide angle FOV formats) via internal memory structures or rounding approximations.

Exemplary Methods

Figure 6:
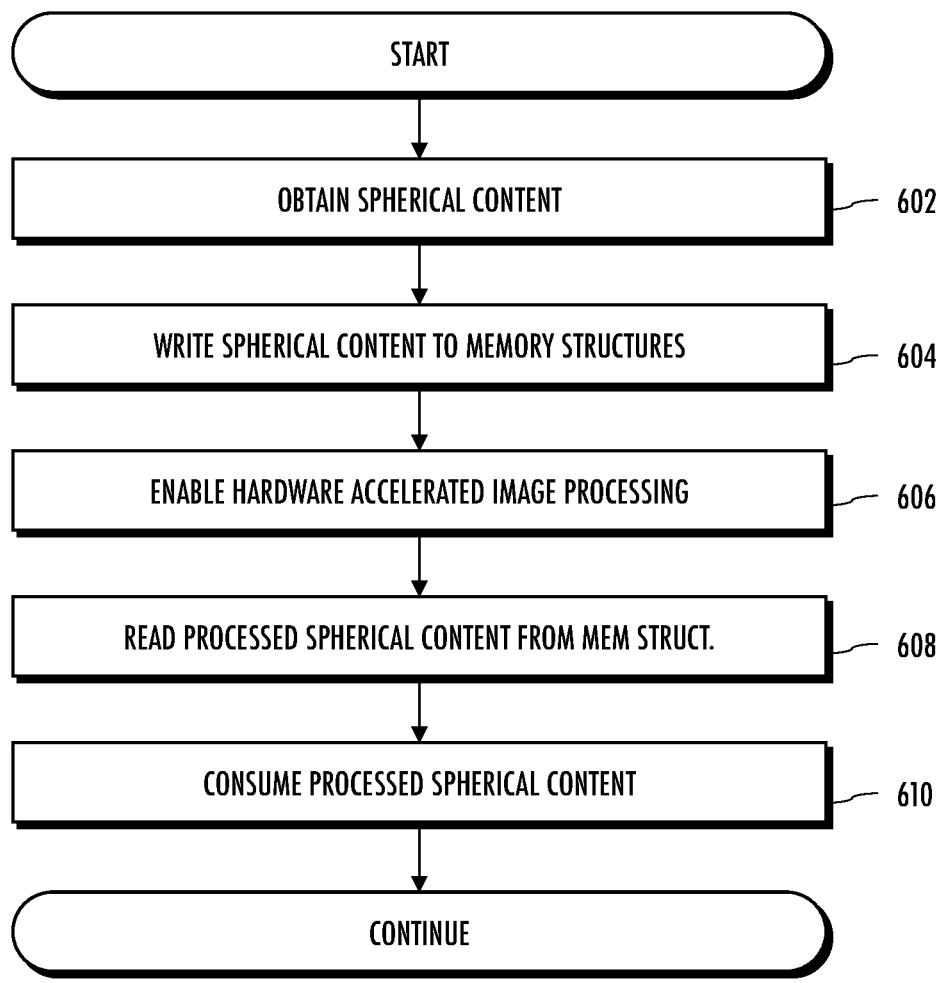
FIG. 6 is a logical block diagram of one exemplary method for image processing spherical content via hardware acceleration components, consistent with various principles of the present disclosure.

FIG. 6 is a logical block diagram of one exemplary method for image processing of spherical content via hardware acceleration components, consistent with various principles of the present disclosure.

At step 602 of the method, a device obtains spherical content. In one exemplary embodiment, the device includes multiple cameras that capture portions of spherical content which are then stitched together. In other embodiments, the device may receive spherical content that requires hardware accelerated image post-processing. In one exemplary embodiment, the spherical content (or image data for the spherical content) includes a three-dimensional (3D) equi-angular cubemap (EAC), or may be projected into an EAC image projection.

At step 604 of the method, the spherical content is written into memory structures. In one embodiment, the spherical content is subdivided and written into memory structures corresponding to a three-dimensional (3D) representation of image space. In one exemplary embodiment, an EAC image is subdivided into facets via existing software addressing and written into the memory buffers (normally used for rectilinear cubemaps) in a GPU. In one such variant, the EAC facets may be translated, rotated, and/or mirrored.

At step 606 of the method, hardware accelerated image processing is performed. In one embodiment, the hardware accelerated image processing configures 2D hardware acceleration to perform 3D image modifications. In one exemplary embodiment, GPU linear blur components (typically used in 2D space) are configured to approximate Gaussian blurs in 3D space. In one such variant, the linear blur components are distinctly weighted based on spatial coordinates (e.g., (0,0), (0,1), (1,0), (1,1), etc.) and blur size.

In one embodiment, wrapping can be performed using hardware accelerated address logic. In one exemplary embodiment, EAC wrapping leverages existing GPU addressing.

In one embodiment, upsampling and/or downsampling of non-power-of-two image content stores non-power-of-two-remainders in dedicated GPU registers (or other GPU memory components). In one embodiment, upsampling and/or downsampling of non-power-of-two image content handles non-power-of-two-remainders with arithmetic rounding approximations.

At step 608 of the method, the processed spherical content is read from the memory structures, and at step 610 of the method, the processed spherical content is consumed. In one embodiment, post-processed EAC content can be reconstructed from rectilinear cubemap buffers of a GPU. In one exemplary embodiment, the post-processed EAC content may be transferred to another device. In another exemplary embodiment, the post-processed EAC content may be displayed.

Additional Configuration Considerations

Throughout this specification, some embodiments have used the expressions "comprises," "comprising," "includes," "including," "has," "having" or any other variation thereof, all of which are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein any reference to any of "one embodiment" or "an embodiment", "one variant" or "a variant", and "one implementation" or "an implementation" means that a particular element, feature, structure, or characteristic described in connection with the embodiment, variant or implementation is included in at least one embodiment, variant or implementation. The appearances of such phrases in various places in the specification are not necessarily all referring to the same embodiment, variant or implementation.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, Ruby, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and the like, as well as taking the form of containerized applications and environments such as Docker, and VMs and associated hypervisors.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, (G)DDR/2/3/4/5/6 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), GPUs, array processors, secure microprocessors, application-specific integrated circuits (ASICs), and/or other digital processing devices. Such digital processors may be contained on a single unitary IC die, or distributed across multiple components.

As used herein, the terms "camera" or "image capture device" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

It will be recognized that while certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed:

1. A non-transitory computer-readable apparatus comprising a plurality of instructions configured to, when executed by a processor apparatus, cause a computerized apparatus to:
   access content comprising an equi-angular cubemap;
   obtain a plurality of equi-angular facets from the equi-angular cubemap via software emulation of hardware by addressing the equi-angular cubemap based on three-dimensional coordinate space;
   write the plurality of equi-angular facets to a memory buffer of a graphics processing unit;
   perform hardware-based image processing on the plurality of equi-angular facets of the equi-angular cubemap to obtain at least one processed image facet;
   read the at least one processed image facet from a first memory buffer; and
   reconstruct a processed equi-angular cubemap.

2. The non-transitory computer-readable apparatus of claim 1, wherein the plurality of instructions are further configured to, when executed by the processor apparatus, cause the computerized apparatus to transfer the processed equi-angular cubemap to an other computerized apparatus.

3. The non-transitory computer-readable apparatus of claim 1, wherein the plurality of instructions are further configured to, when executed by the processor apparatus, cause the computerized apparatus to identify one or more adjacent pixels of at least two facets as neighbors.

4. The non-transitory computer-readable apparatus of claim 1, wherein the plurality of instructions are further configured to, when executed by the processor apparatus, cause the computerized apparatus to up-sample or down-sample the processed equi-angular cubemap.

5. The non-transitory computer-readable apparatus of claim 1, wherein the plurality of instructions are further configured to, when executed by the processor apparatus, cause the computerized apparatus to:
   perform one or more of translation, rotation, or mirroring with respect to a first facet of the plurality of equi-angular facets; and
   align the first facet to a second facet based on the three-dimensional coordinate space.

6. The non-transitory computer-readable apparatus of claim 1, wherein the content comprises stitched content derived from a plurality of image data captured by a plurality of image-capture devices.

7. A method for image processing of spherical content, the method comprising:
   obtaining an equi-angular cubemap;
   obtaining a plurality of equi-angular facets from the equi-angular cubemap via software emulation of hardware by addressing the equi-angular cubemap based on three-dimensional coordinate space;
   performing hardware-based image processing on the plurality of equi-angular facets to obtain at least one processed image facet; and
   reconstructing a processed equi-angular cubemap.

8. The method of claim 7, where the equi-angular cubemap is obtained by stitching a first image captured by a first camera with a first exposure setting and a second image captured by a second camera with a second exposure setting.

9. The method of claim 8, where the hardware-based image processing comprises a multi-band blend that corrects for an exposure difference between the first exposure setting and the second exposure setting.

10. The method of claim 7, where the equi-angular cubemap is obtained as encoded content generated by an other device.

11. The method of claim 10, where the encoded content comprises a two-? dimensional array of pixel values encoded by a commodity codec.

12. The method of claim 7, where a plurality of memory buffers coupled to a graphics processing unit store a representation of the three-dimensional coordinate space.

13. The method of claim 12, where the method further comprises:
   writing the plurality of equi-angular facets to the plurality of memory buffers; and
   reading the at least one processed image facet from a first memory buffer of the plurality of memory buffers.

14. A computerized apparatus comprising:
   a first camera and a second camera;
   a plurality of buffers coupled to hardware accelerator logic;
   a processor; and
   a non-transitory computer-readable apparatus comprising a plurality of instructions configured to, when executed by the processor, cause the computerized apparatus to:
      capture a first image via the first camera and a second image via the second camera;
      generate an equi-angular cubemap from the first image and the second image;
      obtain a plurality of equi-angular facets from the equi-angular cubemap via software emulation of hardware by addressing the equi-angular cubemap based on three-dimensional coordinate space;
      perform hardware-based image processing on the plurality of equi-angular facets to obtain at least one processed image facet; and
      reconstruct a processed equi-angular cubemap.

15. The computerized apparatus of claim 14, further comprising:
   a codec; and
   where the plurality of instructions are further configured to cause the computerized apparatus to encode the processed equi-angular cubemap into an MPEG data structure.

16. The computerized apparatus of claim 15, further comprising:
   a network interface; and
   where the plurality of instructions are further configured to cause the computerized apparatus to transfer the MPEG data structure to another device via the network interface.

17. The computerized apparatus of claim 15, further comprising:
   a removable media interface; and
   where the plurality of instructions are further configured to cause the computerized apparatus to store the MPEG data structure to removeable media.

18. The computerized apparatus of claim 14, where the hardware accelerator logic comprises a commodity graphics processing unit configured to perform a multi-band blend in the three-dimensional coordinate space.

19. The computerized apparatus of claim 14, where the hardware accelerator logic comprises sampling logic for non-power-of-two content.

* * * * *